United States Patent [19]
Donati et al.

[11] Patent Number: 6,079,544
[45] Date of Patent: Jun. 27, 2000

[54] DIVIDING WALL FOR INSTALLATION ABOVE A BELT FOR CONVEYING ARTICLES SUCH AS BOTTLES AND THE LIKE

[75] Inventors: Simone Donati, Massa E Cozzile; Fulvio Bosano, Alessandria, both of Italy

[73] Assignee: Rexnord Marbett S.p.A., Italy

[21] Appl. No.: 09/094,227

[22] Filed: Jun. 9, 1998

[30] Foreign Application Priority Data

Jul. 4, 1997 [IT] Italy ................................ MI97A1601

[51] Int. Cl.[7] ................................. B65G 47/26
[52] U.S. Cl. ..................... 198/446; 198/452; 198/445
[58] Field of Search .................... 198/442, 443, 198/445, 446, 453, 454

[56] References Cited

U.S. PATENT DOCUMENTS

| | | | |
|---|---|---|---|
| 3,862,680 | 1/1975 | Johnson | 198/30 |
| 3,934,706 | 1/1976 | Tice | 198/32 |
| 4,976,343 | 12/1990 | Fuller | 198/453 |
| 5,143,200 | 9/1992 | Fuller | 198/453 |
| 5,160,014 | 11/1992 | Khalar | 198/454 X |

FOREIGN PATENT DOCUMENTS

| | | | |
|---|---|---|---|
| 1105298 | 4/1961 | Germany . | |
| 0052820 | 2/1990 | Japan | 198/446 |
| WO95/34471 | 12/1995 | WIPO . | |

*Primary Examiner*—James R. Bidwell
*Attorney, Agent, or Firm*—Michael Best & Friedrich LLP

[57] ABSTRACT

A dividing wall for installation above a conveyor belt intended to convey articles such as bottles and the like, which allows conveying of the articles divided up into two flows in an easy manner and without obstacles and which is also suitable for construction on a large scale, comprises a plurality of idle rollers situated externally on each side of the wall.

8 Claims, 3 Drawing Sheets

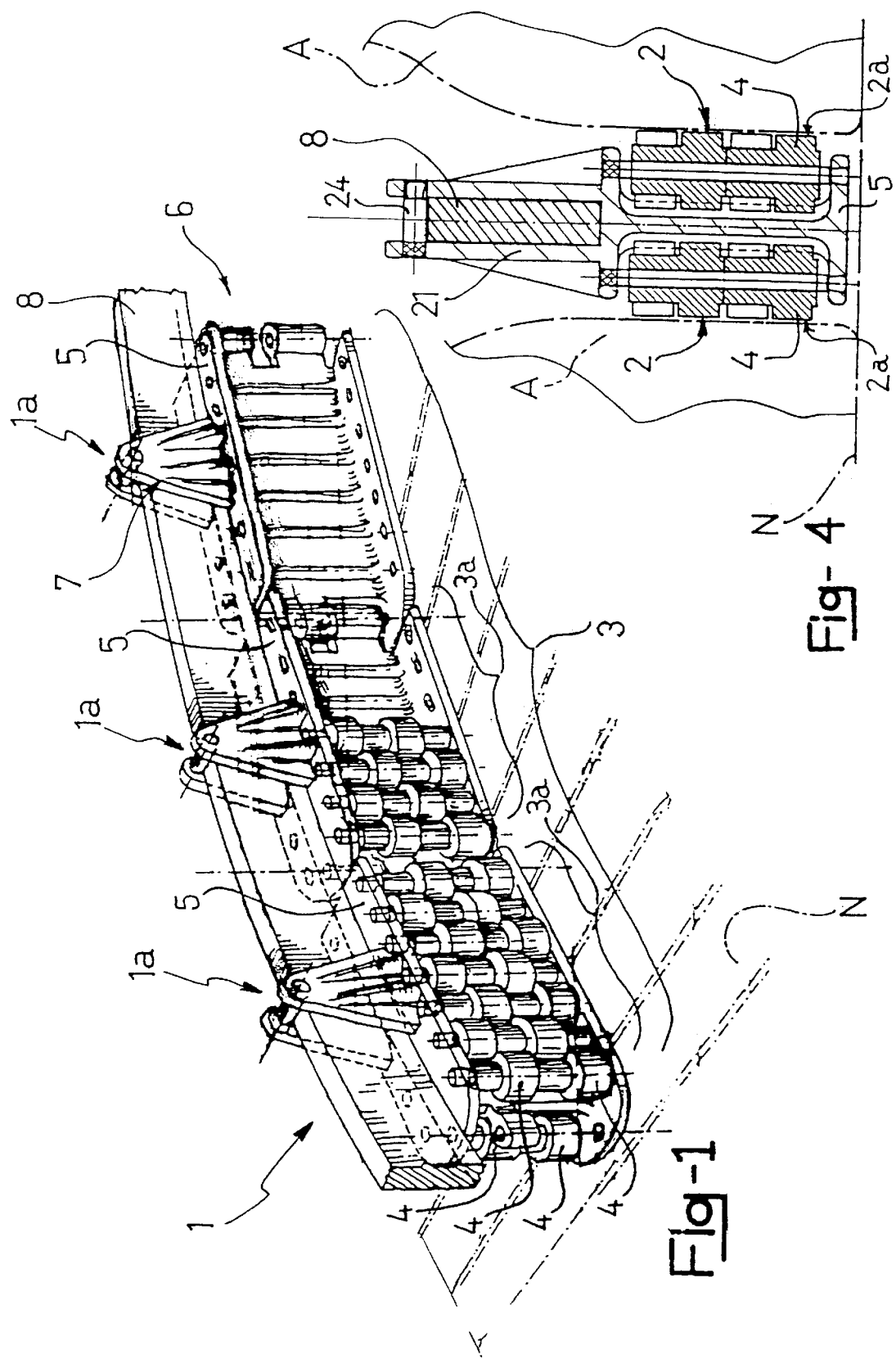

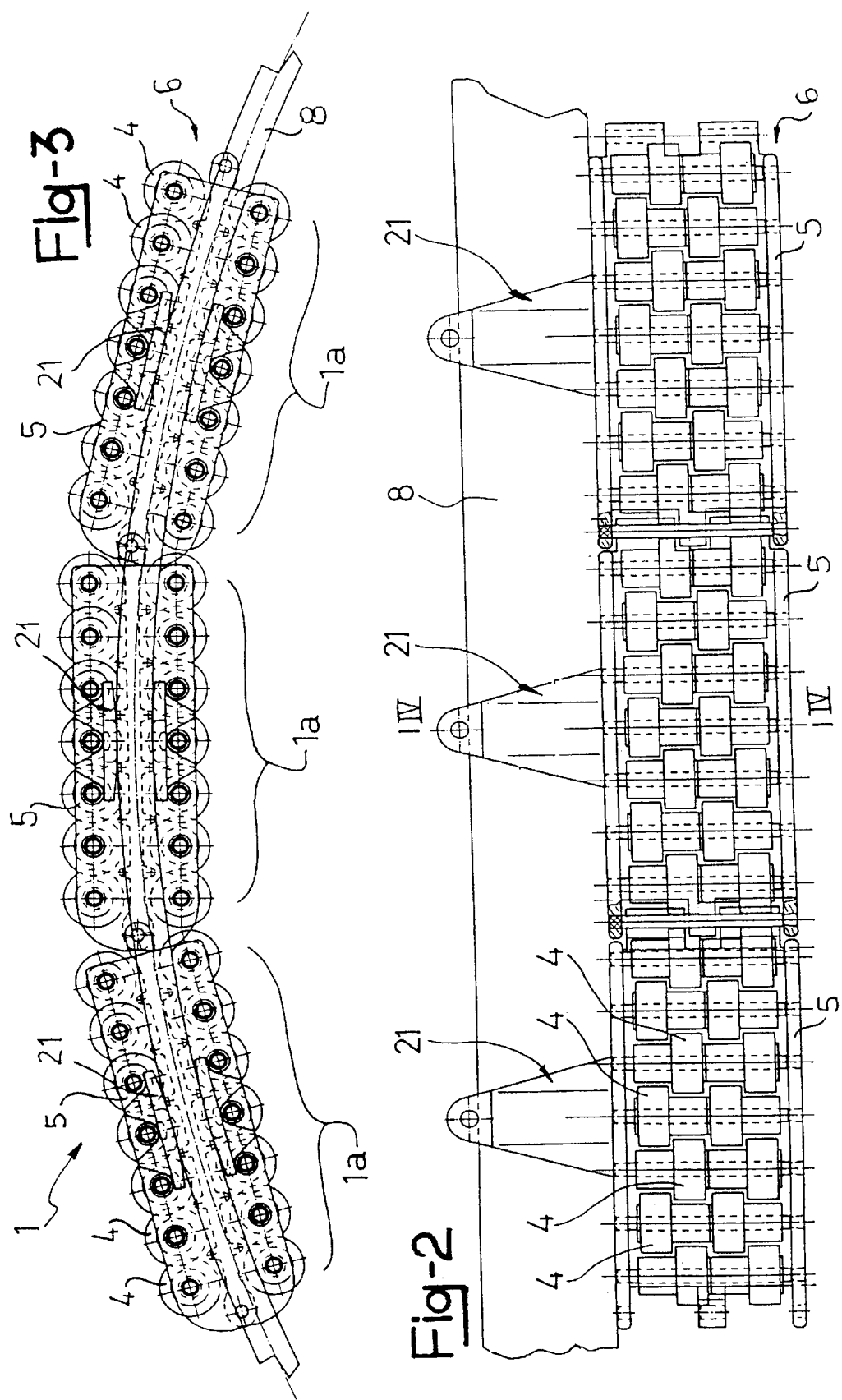

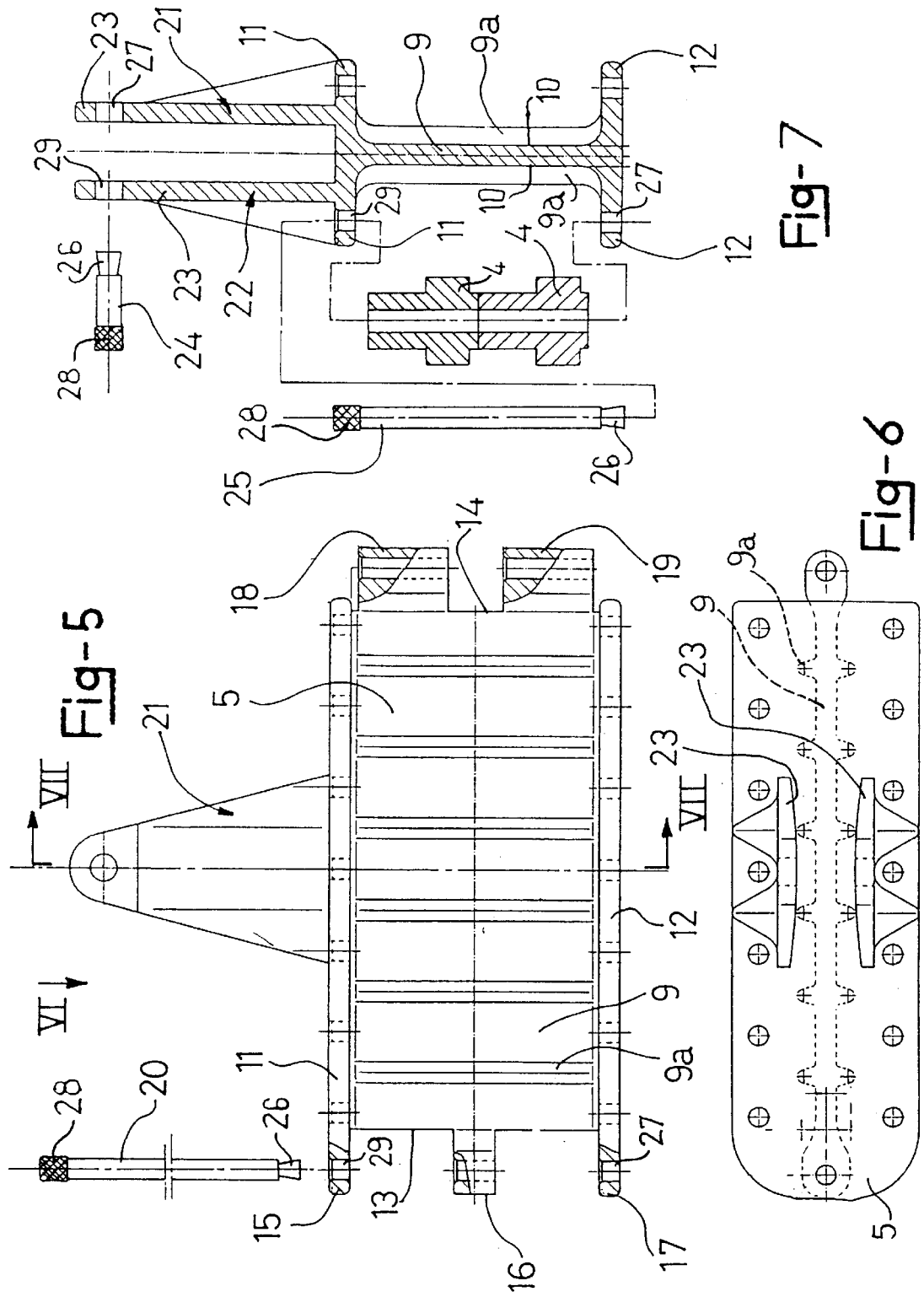

DIVIDING WALL FOR INSTALLATION ABOVE A BELT FOR CONVEYING ARTICLES SUCH AS BOTTLES AND THE LIKE

FIELD OF THE INVENTION

The present invention relates to a dividing wall for installation above a conveyor belt intended to convey articles such as bottles and the like.

As is known, within the context of conveying articles in general, and bottles and the like in particular, there exists the need to divide up a flow of a large number of articles which are fed forwards, conveyed by a conveyor belt, for example of the slat type, into at least two separate flows, each destined for example for a respective filling or bottling or packaging machine and the like.

BACKGROUND OF THE INVENTION

In order to divide up the abovementioned flow it is known to provide dividing walls which sometimes have a curved arrangement and which are arranged above the conveyor belt. These walls, in accordance with the known art, consist of sheet steel, generally stainless steel, the opposite sides of which are distinguished by a very precise finish and in some cases are lined with anti-wear material. These walls, although satisfactory in certain respects, produce, in particular when they have an accentuated curvature, a considerable slowing down of at least one of the flows of the conveyed articles.

The problem underlying the present invention is that of providing a dividing wall which has structural and functional characteristics such as to be able to overcome the abovementioned drawback with reference to the known art.

SUMMARY OF THE INVENTION

This problem is solved by a dividing wall of the type specified, which is characterized by the fact that it comprises a plurality of idle rollers situated externally on two sides of the wall.

BRIEF DESCRIPTION OF THE DRAWINGS

Further characteristic features and advantages of the dividing wall according to the present invention will emerge from the description below of a preferred example of embodiment thereof, provided by way of a non-limiting example, with reference to the accompanying figures, in which:

FIG. 1 shows a perspective view of a dividing wall according to the invention;

FIG. 2 shows a partially sectioned, elevation view of the dividing wall according to FIG. 1;

FIG. 3 shows a plan view of the dividing wall according to FIG. 1;

FIG. 4 shows a sectional view of the dividing wall according to FIG. 1, along the line IV—IV;

FIG. 5 shows a partially sectioned, exploded, elevation view of a detail of the dividing wall according to FIG. 1;

FIG. 6 shows a plan view of detail of the dividing chain according to FIG. 1;

FIG. 7 shows a sectional exploded view of the dividing wall according to FIG. 1;

DETAILED DESCRIPTION OF THE INVENTION

With reference to the accompanying Figures, 1 denotes in its entirety a dividing wall intended to be installed above a conveyor belt N of the slat type, generally of considerable width, for conveying articles A, such as bottles and the like, in order to divide up a flow of conveyed articles A, into flows which are kept separate.

The dividing wall 1 has opposite sides, both indicated by 2, against which the articles A of opposing flows, kept separate by the wall itself, make contact.

The dividing wall 1, in the example, is arranged along an arc of a circle, having a wide radius of curvature, so as to deviate the articles with respect to the direction of advancing movement of the conveyor belt N, as required. Upstream or downstream sections of the dividing wall illustrated in the figures may have respective bends in the opposite direction, depending on the path which is desired for the articles.

In accordance with the invention, the dividing wall 1 comprises a plurality 3 of idle rollers, all indicated by 4, situated externally on each side 2 of the wall itself. In this way the articles A are in contact with the sides 2 of the wall 1 by means of the idle rollers themselves.

Preferably the dividing wall 1 is formed by a succession of wall sections 1a. Each wall section 1a has opposite sides 2a and, on each side 2a, a group 3a of idle rollers of a plurality 3 of idle rollers.

Each wall section 1a comprises a beam 5. The beams 5, together, form a linked arrangement 6 extending horizontally.

The dividing wall 1 comprises support means 7 for mounting the linked arrangement 6 on a bar-shaped guide 8 which preferably has a rectangular cross-section and is arranged edgewise, extending horizontally.

The bar-shaped guide 8 is positioned above the belt 2 at a predetermined distance therefrom.

Each beam 5 has a cross-section in the form of a double T and has a core 9 with opposite sides 10. From each side 10, opposite flanges 11 and 12, i.e. a top flange 11 and a bottom flange 12, project from the core 9. On each side 10, the core 9 has reinforcing ribbing 9a arranged at intervals and extending vertically.

The beam 5 has opposite ends 13 and 14.

At the end 13, the beam comprises three eyelets, i.e. an eyelet 15 formed in an extension of the top flange 11, a middle eyelet 16 projecting from the core 9 and a bottom eyelet 17 projecting from the bottom flange 12.

At the opposite end 14, the beam comprises two eyelets 18 and 19 projecting from the core 9.

The eyelets 15, 16 and 17 of a beam and the eyelets 18 and 19 of an adjacent beam engage with each other in a comb-like manner and form together a hinge for hingeably joining together, by means of a suitable pivot 20, each beam with the adjacent beams in the linked arrangement.

The support means 7 comprise a through-piece 21 associated with each beam 5 and intended to be fitted onto the bar-shaped guide 8.

Each through-piece 21 is formed as a forked member 22 having arms both indicated by 23 and extending from the top flanges 11 of the beam, said forked member engaging with the bar-shaped guide 8 and being closed by a pin 25, extending between the ends of the arms.

The rollers 4 of each group 3a are distributed along the beam and are supported by pivots 25, which consist of a predetermined number, for example seven, said pivots having a vertical axis and extending between the opposite flanges 11 and 12 with an intervalled arrangement. The pivots 25 and the ribs 9a alternate with one another.

In the example, two rollers 4 are mounted on each pivot 25. In particular, the rollers of adjacent pivots are arranged in a staggered or comb-like manner.

It should be noted that, preferably the pivots 20, the pins 24 and the pivots 25, made of steel or a suitable plastic material, are mounted onto the beam and retained thereon by means of the pressure button engagement of a mushroom-shaped end 26 of each pivot with a respective seat 27 formed in the beam. An opposite end 28 of each pivot is knurled so as to favour fixing of each pivot with a respective seat 29 formed in the beam.

It should be noted that the beams 5 are each made, by means of injection-moulding, from a suitable plastic. Similarly, the rollers 4, which are all identical to one another, are made by means of injection-moulding from a suitable plastic material.

The main advantage of the dividing wall according to the present invention lies in the fact that it allows conveying of the articles above the conveyor belt and also where sharp bends are present in both directions, with an unusually small amount of friction and without obstacles.

Moreover, the dividing wall according to the present invention is structurally simple—a not insignificant advantage for an article which has to be manufactured on a large scale.

It should also be noted that the dividing wall according to the present invention is favourable from the point of view of hygiene, since there are practically no longer any signs of wear and consequently no traces of dust and dirt released during operation.

A further advantage of the dividing wall according to the invention lies in the ease and rapidity of installation. In fact, the linked arrangement is rapidly fastened to the bar-shaped guide by means of simple insertion of the pins into the respective arms.

Obviously the dividing wall described above and illustrated in the figures may be subject to numerous modifications and variations performed by a person skilled in the art, all of which, however, are contained within the protective scope of the invention, as defined by the claims below.

We claim:

1. A dividing wall for installation above a conveyor belt intended for conveying articles, wherein the dividing wall comprises a wall having opposite sides, a first plurality of idler rollers mounted on one of the opposite sides of the wall and a second plurality of idler rollers mounted on the other of the opposite sides of the wall.

2. The dividing wall according to claim 1, wherein the dividing wall comprises a plurality of beams forming a linked arrangement, as well as support means for mounting the linked arrangement above the belt.

3. The dividing wall according to claim 2, wherein the support means for the linked arrangement comprise at least one through-piece associated with each beam and intended to be fitted onto a bar-shaped guide positioned above the belt.

4. The dividing wall according to claim 3, wherein each beam of the linked arrangement is provided with eyelets for hingeably joining to adjacent beams in the linked arrangement.

5. The dividing wall according to claim 4, wherein characterized in that each beam has a cross-section in the form of a double T, with a core and opposite flanges projecting from each side of the core.

6. The dividing wall according to claim 5, wherein the rollers are rotatably supported on pivots extending between the opposite flanges projecting from each side of the core.

7. The dividing wall according to claim 6, wherein the rollers supported on adjacent pivots are engaged with each other substantially in a comb-like manner.

8. The dividing wall according to claim 7, wherein said at least one through-piece consists of a forked member with arms extending from the top flanges of the beam, which engages over the bar-shaped guide and is closed on the bar-shaped guide by a pin extending between the ends of the arms.

* * * * *